(12) United States Patent
Ohga

(10) Patent No.: US 8,013,903 B2
(45) Date of Patent: Sep. 6, 2011

(54) COLOR PROCESSING METHOD, PROGRAM THEREFOR, AND IMAGE PICKUP APPARATUS

(75) Inventor: Manabu Ohga, Yokohama (JP)

(73) Assignee: Canon Ksbushiki Kaisha (JP)

( * ) Notice: Subject to any disclaimer, the term of this patent is extended or adjusted under 35 U.S.C. 154(b) by 509 days.

(21) Appl. No.: 11/344,515

(22) Filed: Jan. 31, 2006

(65) Prior Publication Data
US 2006/0192861 A1   Aug. 31, 2006

(30) Foreign Application Priority Data
Feb. 1, 2005   (JP) .................................. 2005-025611

(51) Int. Cl.
*H04N 5/228* (2006.01)
(52) U.S. Cl. ............... 348/222.1; 348/229.1; 348/223.1; 348/571; 382/167; 382/162; 382/274; 382/254; 382/276; 358/518; 358/519; 358/520; 358/521; 358/504; 358/505; 358/516; 358/474; 358/406
(58) Field of Classification Search ............... 348/229.1, 348/223.1, 222.1, 571; 382/167, 274, 162, 382/254, 276; 358/518–521, 504–505, 516, 358/474, 406
See application file for complete search history.

(56) References Cited

U.S. PATENT DOCUMENTS

| | | | |
|---|---|---|---|
| 5,596,428 A * | 1/1997 | Tytgat et al. ................. | 358/518 |
| 5,838,333 A * | 11/1998 | Matsuo ......................... | 345/604 |
| 6,226,011 B1 * | 5/2001 | Sakuyama et al. ........... | 345/600 |
| 6,542,634 B1 | 4/2003 | Ohga | |
| 6,594,388 B1 * | 7/2003 | Gindele et al. ............... | 382/167 |
| 6,636,260 B2 | 10/2003 | Kiyokawa | |
| 6,791,711 B1 * | 9/2004 | Uekusa et al. ................ | 358/1.9 |
| 6,816,179 B2 * | 11/2004 | Hanyu ........................... | 347/131 |
| 6,999,617 B1 * | 2/2006 | Ohga ............................ | 382/167 |
| 7,002,623 B1 * | 2/2006 | Ohyama et al. ............ | 348/225.1 |
| 7,006,105 B2 * | 2/2006 | Deishi et al. ................. | 345/590 |
| 7,369,698 B2 * | 5/2008 | Okutsu et al. ................ | 382/162 |
| 7,397,947 B2 * | 7/2008 | Hibi et al. ..................... | 382/167 |
| 7,480,421 B2 * | 1/2009 | Henley ......................... | 382/274 |
| 7,515,744 B2 * | 4/2009 | Okutsu et al. ................ | 382/162 |
| 2002/0027603 A1 * | 3/2002 | Kuwata et al. ............... | 348/232 |
| 2003/0016862 A1 * | 1/2003 | Ohga ............................ | 382/162 |
| 2003/0034986 A1 * | 2/2003 | Fukasawa ..................... | 345/591 |
| 2003/0184779 A1 * | 10/2003 | Ohga ............................ | 358/1.9 |
| 2004/0141069 A1 * | 7/2004 | Nakami ........................ | 348/231.6 |
| 2004/0228523 A1 * | 11/2004 | Hibi et al. ..................... | 382/162 |
| 2004/0228524 A1 * | 11/2004 | Okutsu et al. ................ | 382/162 |
| 2005/0168596 A1 * | 8/2005 | Ito et al. ..................... | 348/222.1 |
| 2005/0169523 A1 * | 8/2005 | Hayaishi ...................... | 382/167 |
| 2007/0058186 A1 * | 3/2007 | Tanaka .......................... | 358/1.9 |

FOREIGN PATENT DOCUMENTS

| | | |
|---|---|---|
| JP | 11-017970 A | 1/1999 |
| JP | 2000-50086 A | 2/2000 |
| JP | 2002-238056 A | 8/2002 |

* cited by examiner

*Primary Examiner* — David L Ometz
*Assistant Examiner* — Antoinette T Spinks
(74) *Attorney, Agent, or Firm* — Rossi, Kimms & McDowell LLP

(57) ABSTRACT

A color processing method which sets viewing conditions easily and properly from shooting conditions added to an image. Shot image data and shooting conditions of the image data are obtained. Input side viewing conditions from the obtained shooting conditions are set. The image data with a color appearance model based on the set input side viewing conditions are converted.

4 Claims, 9 Drawing Sheets

| | FIG.2 | FIG.2A |
|---|---|---|
| | | FIG.2B |

| | EXIF TAG INFORMATION | PARAMETER VALUE | |
|---|---|---|---|
| WhitePoint | WHITE POINT CHROMATICITY | (x,y) | |
| ExposureTime | EXPOSURE TIME | T[sec] | |
| ExposureProgram | EXPOSURE CONTROL PROGRAM | 0 : UNDEFINED | |
| | | 1 : MANUAL | |
| | | 2 : PROGRAM AE | |
| | | 3 : APERTURE PRIORITY | |
| | | 4 : SHUTTER SPEED PRIORITY | |
| | | 5 : ... | |
| ISOSpeedRatings | FILM ISO SENSITIVITY | ASA | |
| ApertureValue | LENS APERTURE | F | |
| LightSource | TYPE OF LIGHT SOURCE (IN CASE OF MANUAL SETTING) | 0 : UNDEFINED | |
| | | 1 : DAYLIGHT | |
| | | 2 : FLUORESCENT LAMP | |
| | | 3 : TUNGSTEN | |
| | | 4 : FLASH | |
| | | 9 : FINE WEATHER | |
| | | 10 : CLOUDY WEATHER | |
| | | 11 : SHADOW | |

FIG. 2B

| ColorSpace | COLOR SPACE | 1 : sRGB |
| | | 2 : AdobeRGB |
| | | 3 : ... |
| | | 12 : DAYLIGHT COLOR FLUORESCENT LAMP (D) |
| | | 13 : DAYLIGHT COLOR FLUORESCENT LAMP (N) |
| | | 14 : WHITE FLUORESCENT LAMP (W) |
| | | 15 : WARM WHITE FLUORESCENT LAMP (WW) |
| | | 17 : "A" ILLUMINANT |
| | | 18 : "B" ILLUMINANT |
| | | 19 : "C" ILLUMINANT |
| | | 20 : D55 ILLUMINANT |
| | | 21 : D65 ILLUMINANT |
| | | 22 : D75 ILLUMINANT |
| | | 23 : D50 ILLUMINANT |
| | | 24 : ... |

| ApertureValue (APEX) | F-Number |
|---|---|
| 0 | 1 |
| 1 | 1.4 |
| 2 | 2 |
| 3 | 2.8 |
| 4 | 4 |
| 5 | 5.6 |
| 6 | 8 |
| 7 | 11 |
| 8 | 16 |
| 9 | 22 |
| 10 | 32 |

*FIG. 8B*

| ShutterSpeed Value (APEX) | ExposureTime (second) |
|---|---|
| -5 | 30 |
| -4 | 15 |
| -3 | 8 |
| -2 | 4 |
| -1 | 2 |
| 0 | 1 |
| 1 | 1/2 |
| 2 | 1/4 |
| 3 | 1/8 |
| 4 | 1/15 |
| 5 | 1/30 |
| 6 | 1/60 |
| 7 | 1/125 |
| 8 | 1/250 |
| 9 | 1/500 |
| 10 | 1/1000 |
| 11 | 1/2000 |

*FIG. 8C*

| BrightnessValue (APEX) | footlambert |
|---|---|
| -2 | 1/4 |
| -1 | 1/2 |
| 0 | 1 |
| 1 | 2 |
| 2 | 4 |
| 3 | 8 |
| 4 | 15 |
| 5 | 30 |

FIG. 9

COLOR PROCESSING METHOD, PROGRAM THEREFOR, AND IMAGE PICKUP APPARATUS

BACKGROUND OF THE INVENTION

1. Field of the Invention

The present invention relates to a color processing method that sets viewing conditions based on shooting conditions, a program thereof, and an image pickup apparatus.

2. Description of the Related Art

Figure 6:
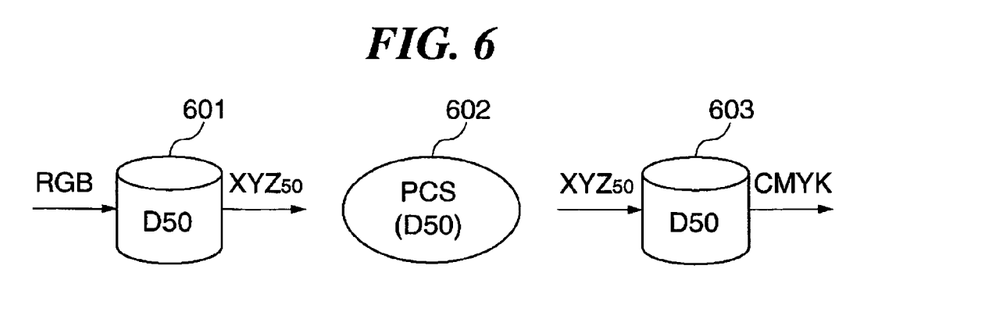
FIG. 6 is a view which is useful in explaining conventional color matching among different devices.

Conventionally, color matching among different devices is generally made in such a method as is shown in FIG. 6.

Specifically, input data such as RGB data is converted into XYZ data in a device-independent color space by using an input profile 601. Next, a color outside a color gamut of an output device cannot be expressed by the output device. Therefore, color gamut mapping in a PCS 602 converted XYZ data into mapped XYZ data within the color gamut of the output device. Then, the mapped data is converted from the XYZ data in device-independent color space to CMYK data in device-dependent color space by using the output profile 603.

However, it is difficult to perform color matching under different viewing conditions. A human color appearance model must be introduced so that color matching is realized under different viewing conditions.

Figure 4:
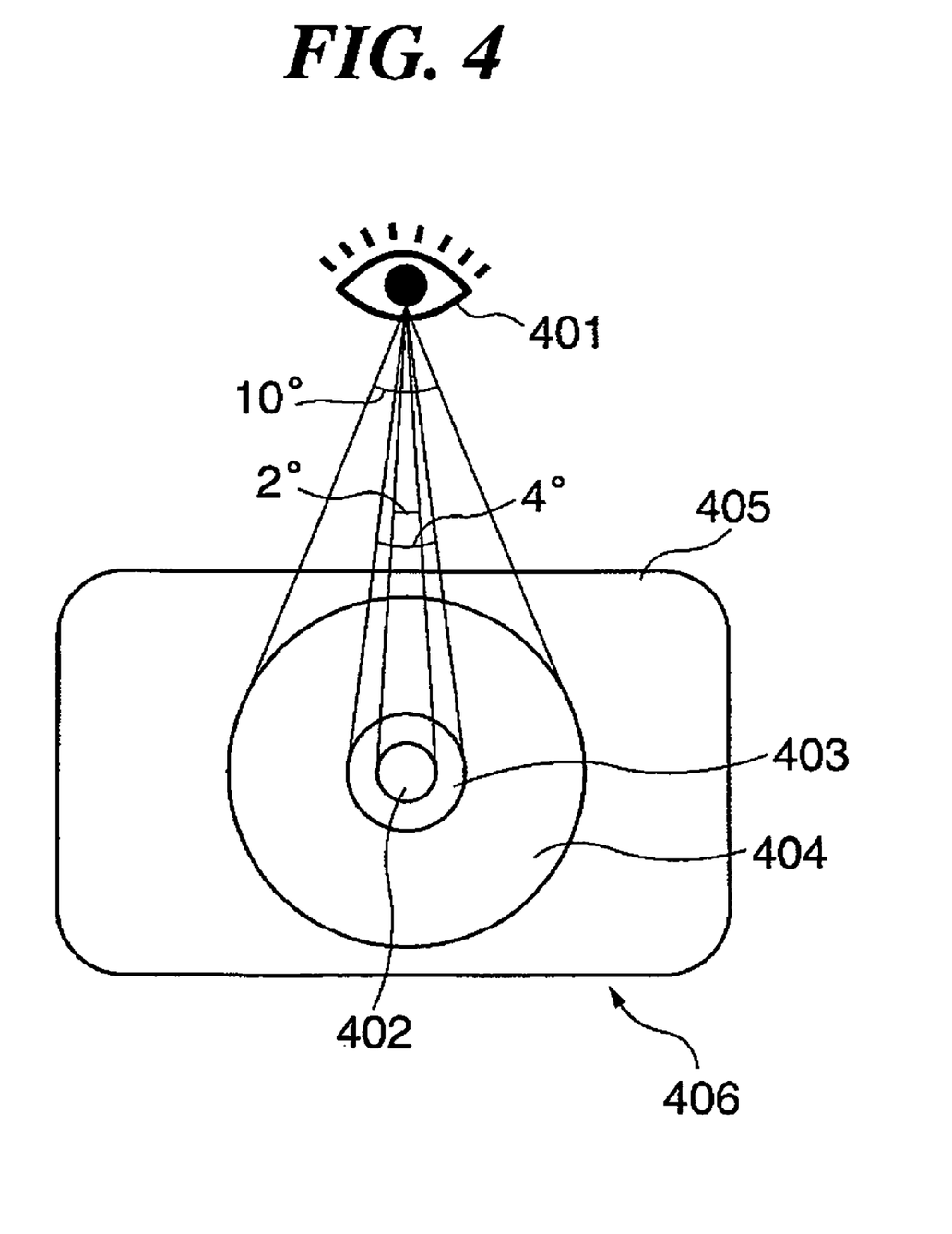
FIG. 4 is a view which is useful in explaining a human color appearance model.

The human color appearance model is designed so that human color appearance may be estimated accurately when a color patch of a viewing angle 2° is given, and defines a human field of view, as is shown in FIG. 4. Generally, a standard calorimetric observer 401 in CIE 1931 color system has an applicable range at a viewing angle 1° to 4°, therefore this applicable range field is divided into a stimulus field 402 below a viewing angle 2° and an adjacent field 403 below a viewing angle 4°. Then, the field between the adjacent field 403 at a viewing angle 4° and a field at a viewing angle 10° is called a background field 404, and a field surrounding the background field 404 is called a surrounding field 405. Furthermore, a field of vision consisting of the stimulus field 402, the adjacent field 402, the background field 403, and the surrounding field 404 is called an adaptation field 405.

Typical color appearance models such as CIE CAM97s and CIE CAM02 define the viewing condition parameters necessary to convert a relative XYZ value of a color patch into a JCh value or QMh value on the color appearance space independent from viewing conditions.

Figure 7:
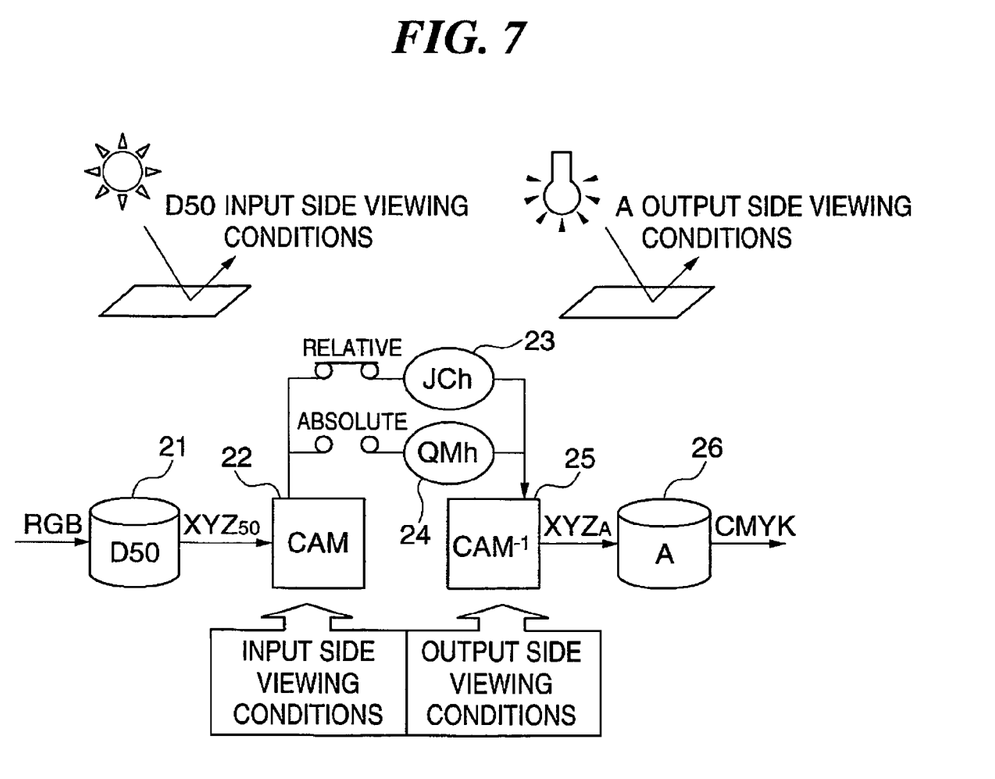
FIG. 7 is a view which is useful in explaining a conventional color matching among different output devices, input and output viewing conditions being considered.

Next, input and output viewing conditions being considered, a color matching method performed among different output devices will be described with reference to FIG. 7. FIG. 7 is a view which is useful in explaining the color matching among different output devices, considering input/output viewing conditions. A light source on the input side is D50, and a light source on the output side is A.

First, the input data such as the RGB data under a D50 light source is converted into XYZ data under the D50 light source by using an input profile 21.

Next, the converted XYZ data is subjected to the forward conversion of a color appearance model according to the input side viewing conditions in a CAM 22, and then is converted into JCh data 23 or QMh data 24 in color space independent from the viewing conditions. Then, the gamut mapping is performed to the JCh data 23 or QMh data 24. The JCh data 23 or QMh data 24 is subjected to inverse conversion of the color appearance model according to the output side viewing conditions in CAM 25, and then is converted into XYZ data under an "A" light source. The XYZ data under the light source of output viewing conditions (the "A" light source) is converted into CMYK data under "A" light source by using the output profile 26. (Refer to Japanese Laid-Open Patent Publication (Kokai) No. 2000-050086 (U.S. Pat. No. 6,542,634), for example).

Conventionally, there has been another problem that it is a user that needs to set input and output viewing condition parameters through a user interface, which is too complicated for an average user to understand. A method in which viewing condition parameters for each viewing condition are pre-stored in a profile in order to facilitate the user setting, and a user needs to choose one of the pre-stored viewing condition parameters has also been used However, it is difficult to properly set the viewing condition parameters for an image shot by a digital camera because the viewing conditions at a shooting place are unclear, and the shooting conditions are different.

SUMMARY OF THE INVENTION

It is an object of the present invention to provide a color processing method that sets viewing conditions easily and properly from shooting conditions added to an image, a program thereof, and an image pickup apparatus.

To attain the above object, in a first aspect of the present invention, there is provided a color processing method comprising an obtaining step of obtaining shot image data and shooting conditions of the image data, a setting step of setting input side viewing conditions from the obtained shooting conditions, and a converting step of converting the image data with a color appearance model based on the set input side viewing conditions.

Preferably, the input side viewing conditions contain light source white point information, and the converting step converts the image data into device-independent color space data with converting information corresponding to the light source white point data, and the device-independent color space data is converted with the color appearance model based on the input side viewing conditions.

Preferably, the shooting conditions contain exposure time, film ISO sensitivity, and lens aperture, and the input side viewing conditions contain adaptation luminance, relative luminance of background and surrounding luminance level.

Preferably, the shooting conditions contain the type of exposure control method, the relative luminance of background is set at 18% when the exposure control method is manual, and the relative luminance of background is set at any value different from 18% when the exposure control method is automatic.

To attain the above object, in a second aspect of the present invention, there is provided a computer readable program for executing a color processing method comprising an obtaining step of obtaining shot image data and shooting conditions of the image data, a setting step of setting input side viewing conditions from the obtained shooting conditions, and a converting step of converting the image data with a color appearance model based on the set input side viewing conditions.

Preferably, the input side viewing conditions contain light source white point information, and the converting step converts the image data into device-independent color space data with converting information corresponding to the light source white point data, and the device-independent color space data is converted with the color appearance model based on the input side viewing conditions.

Preferably, the shooting conditions contain exposure time, film ISO sensitivity, and lens aperture, and the input side viewing conditions contain adaptation luminance, relative luminance of background and surrounding luminance level.

To attain the above object, in a third aspect of the present invention, there is provided an image pickup apparatus comprising an obtaining unit that obtains shot image data and shooting conditions of the image data, a setting device that sets input side viewing conditions from the obtained shooting conditions, and a converting device that converts the image data with a color appearance model based on the set input side viewing conditions.

Preferably, the input side viewing conditions contain light source white point data, and the converting device converts the image data into device-independent color space data with converting data in response to the light source white point data, and converts the device-independent color space data with the color appearance model based on the input side viewing conditions.

Preferably, the shooting conditions contain exposure time, film ISO sensitivity, and lens aperture, and the input side viewing conditions contain adaptation luminance, relative luminance of background and surrounding luminance level.

The above and other objects, features, and advantages of the present invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

Figure 1:
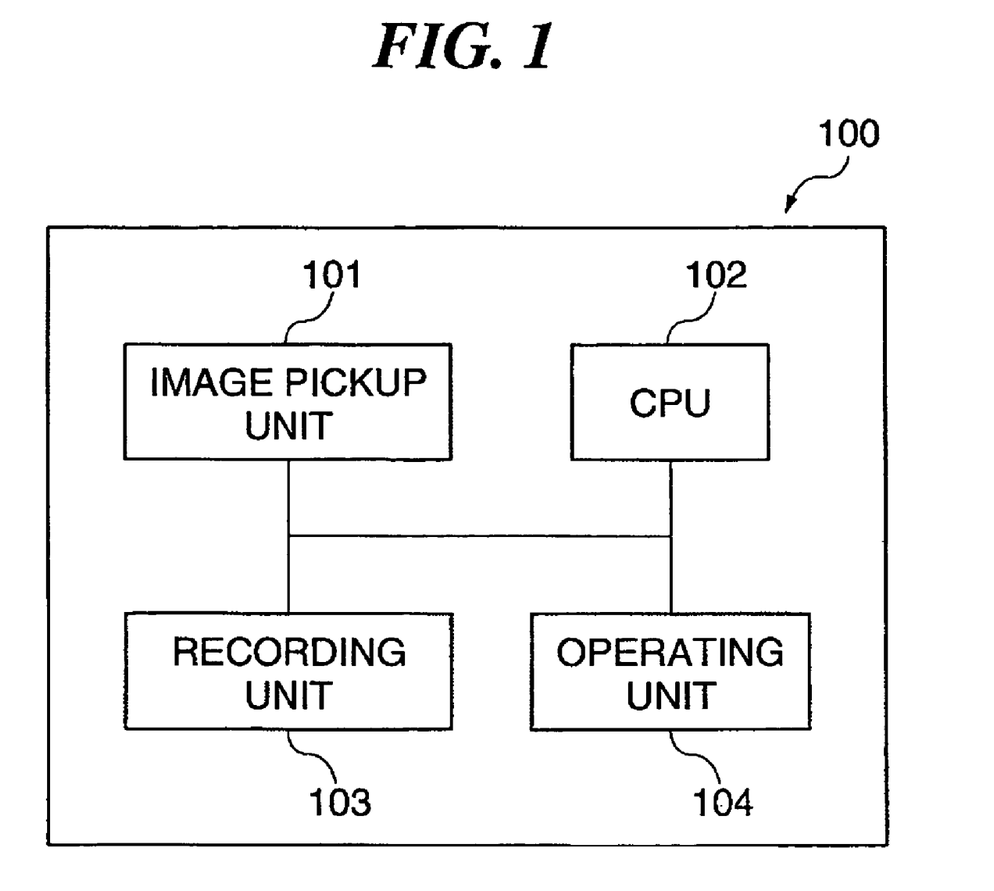
FIG. 1 is a block diagram schematically showing the construction of a digital camera as an image pickup apparatus according to an embodiment of the present invention.

FIG. 1 is a block diagram schematically showing the construction of a digital camera as an image pickup apparatus according to an embodiment of the present invention;

In FIG. 1, a digital camera 100 is provided with the following construction elements linked to one another through a bus. An image pickup unit 101 images an image object. A CPU 102 controls the entire digital camera 100. A recording unit 103 records an image imaged by the image pickup unit 101 as a file format together with the Exif tag information. An operating unit 104 inputs user's instructions relating to image shooting.

Figure 2A:
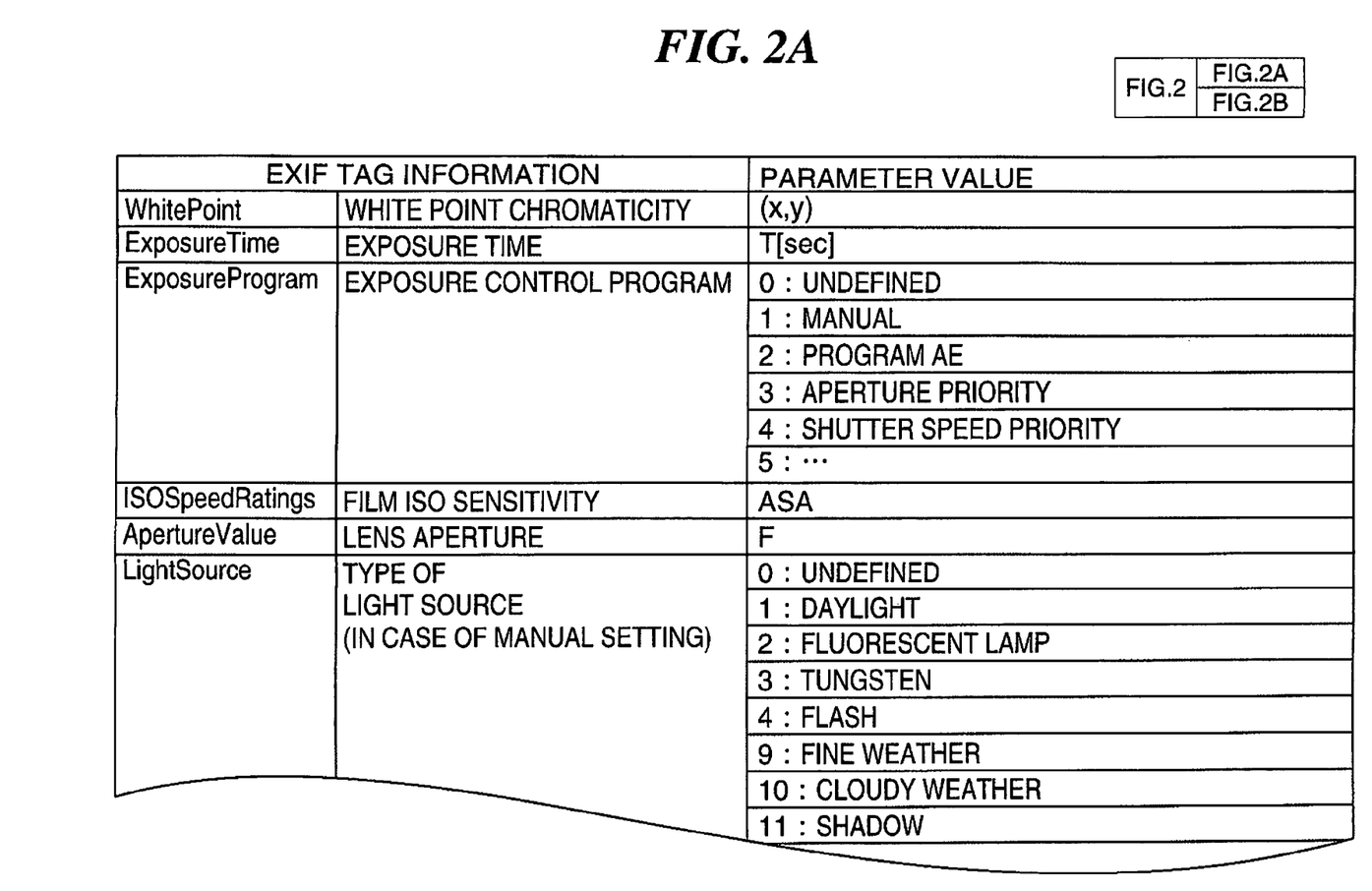
FIGS. 2A to 2B are views which are useful in explaining the data contained in an Exif tag of an image file made by the digital camera of FIG. 1.
Figure 2B:
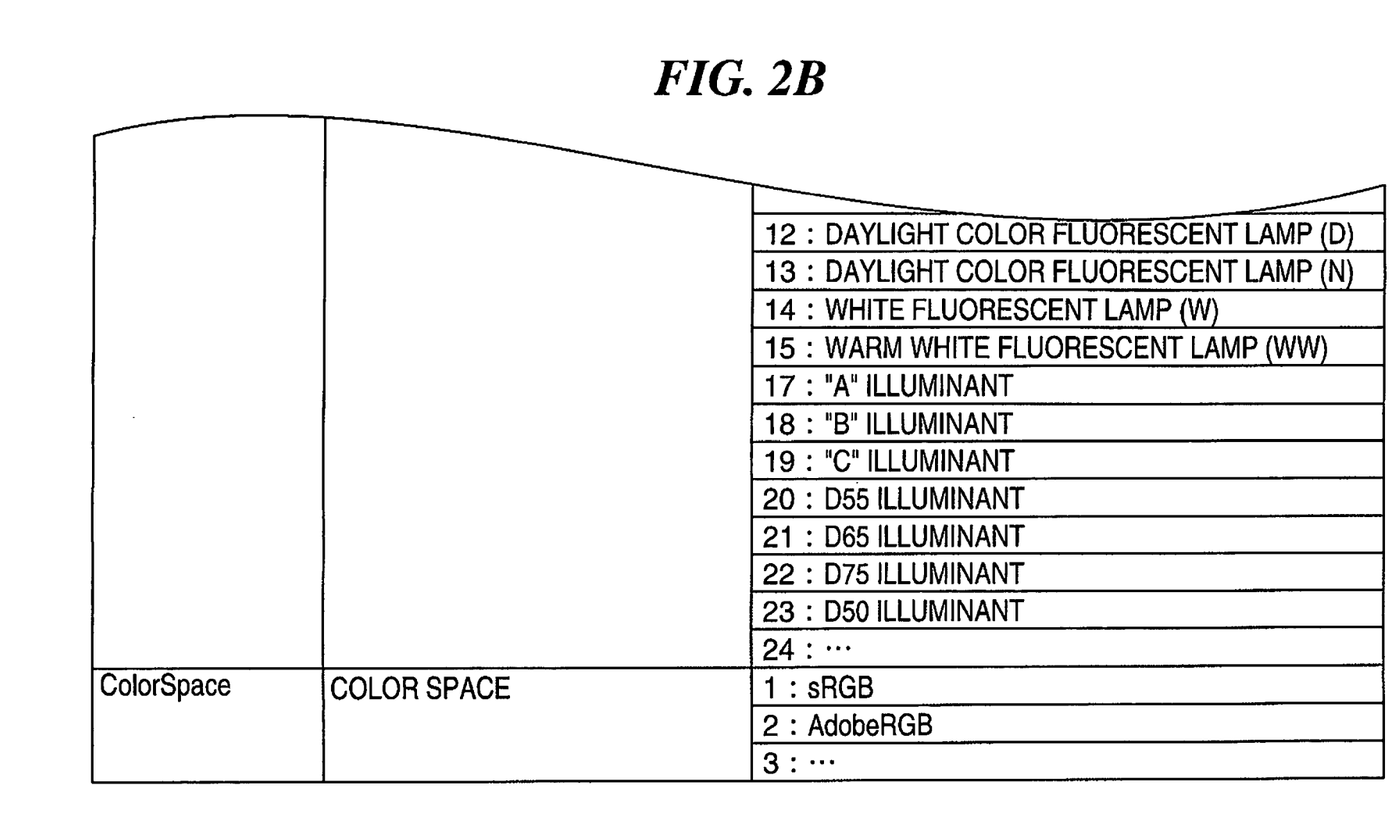

FIGS. 2A to 2B are views which are useful in explaining the data contained in an Exif tag of an image file made by the digital camera of FIG. 1

Shooting condition parameter values such as white point chromaticity (White Point:(x, y)), exposure time (T[sec]), the type of exposure control program, ISO sensitivity (ASA), lens aperture (F), the type of light sources (in the case of manual setting), and color space, etc. are described in the Exif tag of this embodiment.

In addition, according to this embodiment n both the white point chromaticity and the type of light sources are supposed to be described as shooting condition parameter values in the Exif tag, but only one of them may be described as the shooting condition parameter values in the Exif tag.

According to this embodiment, the following color matching is performed to image data with Exif tag data obtained from the digital camera 100.

Figure 9:
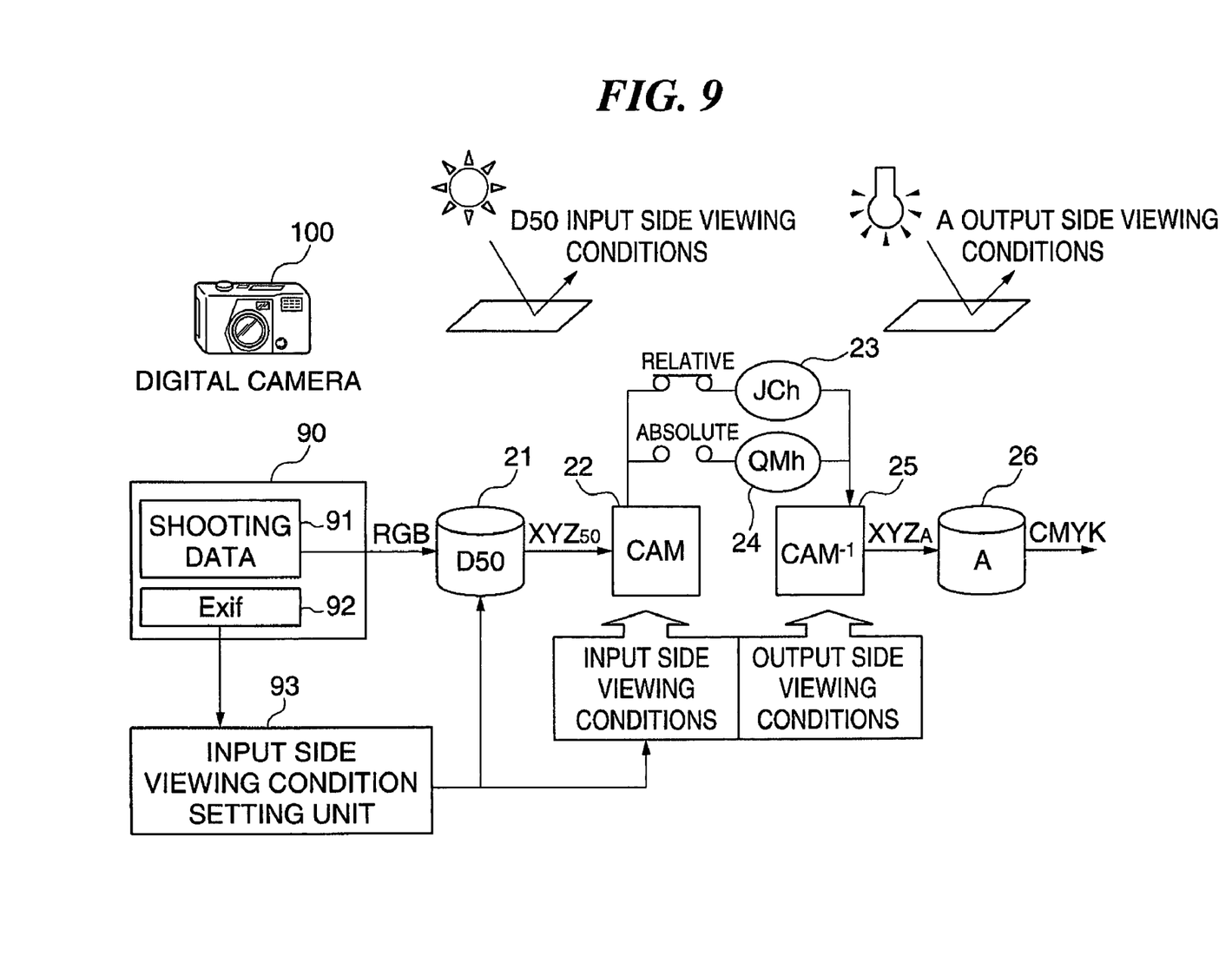
FIG. 9 is a view which is useful in explaining the color matching in this embodiment.

FIG. 9 is a view which is useful in explaining the color matching in this embodiment. The color matching is different from the conventional color matching (FIG. 7) in that the input side (source) viewing condition is based on the Exif tag information of an image file. In FIG. 9, component elements corresponding to those of FIG. 7 are designated by identical reference numerals, and description thereof is omitted.

In the color matching shown in FIG. 9, first, an image data with Exif tag information is obtained. Next, an input side viewing condition setting unit 93 performs the processes shown in FIG. 3 which will be hereinafter described, and an input side viewing conditions (adaptation luminance (LA[cd/m$^2$])); a white point relative XYZ value ($X_W Y_W Z_W$), relative luminance of background (Yb[%]), and a surrounding luminance level) are set based on the Exif tag information 92. The input profile 21 is set by the process in FIG. 5, based on the input viewing condition.

The viewing conditions mean parameters based on a human color appearance model. Specifically, the viewing condition parameters includes parameters such as absolute luminance (hereinafter referred to as "the adaptation luminance") (LA[cd/m$^2$]) in the adaptation field 406, a white point relative XYZ value ($X_W Y_W Z_W$), relative luminance in the background field 404 (hereinafter referred to as "the relative luminance of background") (Yb[%]), a surrounding luminance level, the type of a light source, and the color space, etc. The viewing condition parameters are necessary to convert the relative XYZ value of a color patch into the JCh value or QMh value on the color appearance space independent from viewing conditions.

The adaptation luminance (LA) value is usually set at 20% of the white point absolute luminance in the adaptation field 406 (FIG. 4). The surrounding luminance level is set at "Average" when the relative luminance value of background is higher than 20% of the white point in the adaptation field 406, at "Dim" when it is lower than 20%, or at "Dark" when it is almost 0%.

The color matching process shown in FIG. 9 is performed by information processing device such as personal computers, for example. This information processing device pre-stores profiles of a digital camera, corresponding to different light sources. The profiles of a digital camera corresponding to light sources are obtained from the white point relative XYZ value under different light sources and RGB values of the digital camera 100. The white point relative XYZ value under different light sources is obtained by applying spectral data of a plurality of standard light sources (including fluorescent lamps) to spectral reflectance obtained from performing color reading of each patch of color targets such as Gretag Macbeth Color Checker DC.

It should be noted that, for example, the output side (source) viewing conditions are set based on a user's manual instruction in a conventional manner, or the preset standard viewing conditions are set.

Figure 3:
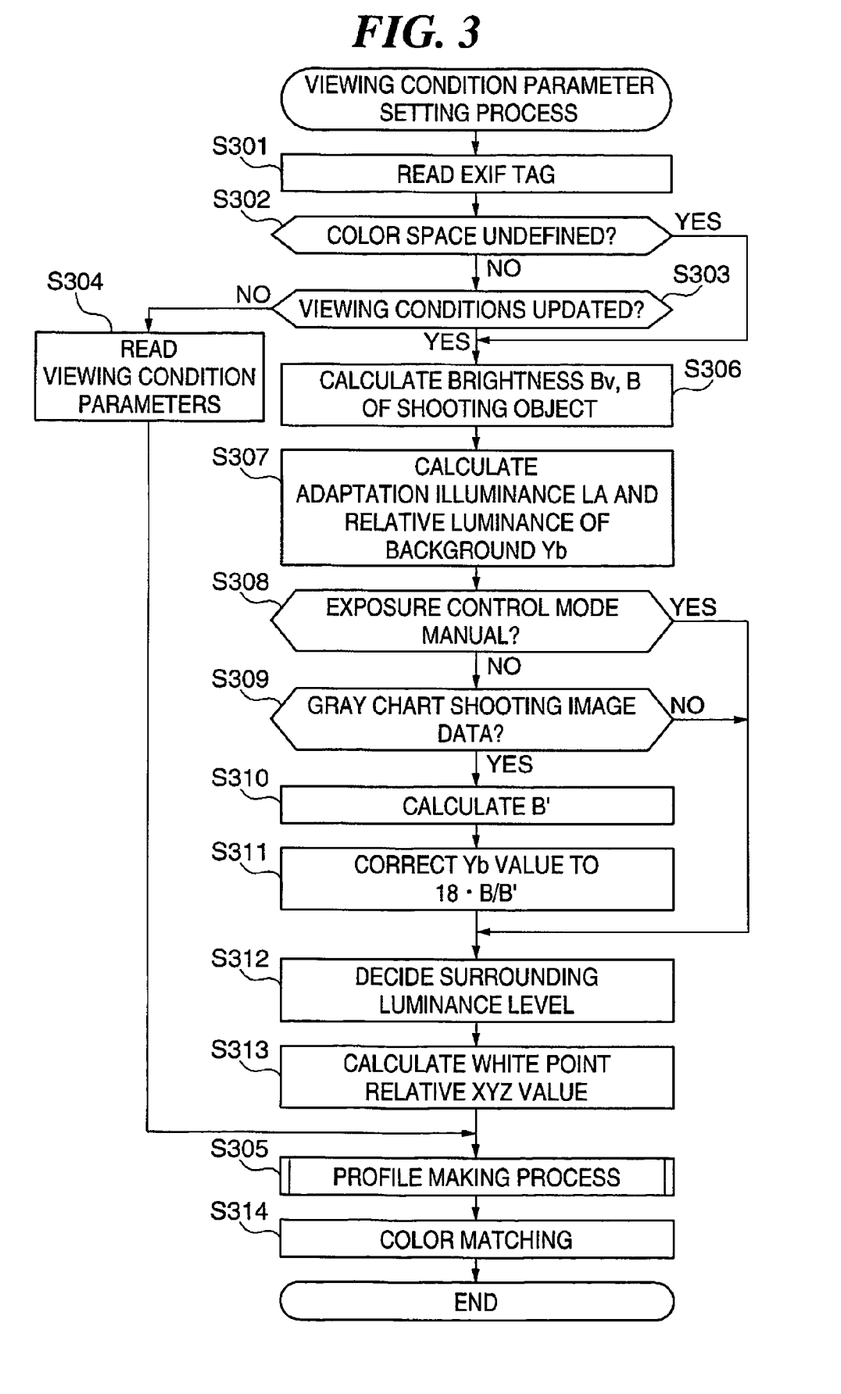
FIG. 3 is a flowchart showing the procedure of an input side viewing condition parameter setting process that is performed by an input side viewing condition setting unit in FIG. 9.

FIG. 3 is a flowchart showing the procedure of an input side viewing condition parameter setting process that is performed by the input side viewing condition setter 93 in FIG. 9.

In a step S301, first, the Exif tag data is read in. In a step S302 it is determined whether or not the color space is undefined by referring to the color space information of the Exif tag information. As a result of the determination in the step S302, if the color space is defined, it is determined whether or not a user has instructed updating of the viewing conditions in a step S303.

As a result of the determination in the step S303, if the user does not instruct updating, the viewing condition parameter pre-stored in the information processing unit in response to the color space defined in the Exif tag information are set as an input side viewing conditions in the step S304.

For example, if sRGB is defined as a color space, the viewing condition parameters set in a step S304 are an adaptation luminance value 16 cd/m², a white point relative XYZ value (0.9505, 1.0000, 1.0891), a relative luminance value of background 20%, and a surrounding luminance level Dim. This initialization setting is performed under a light source D 65.

Back to FIG. 3, if the color space is determined as undefined in the step S302, or if the user instructs updating of the viewing conditions in the step S303, then the process proceeds to a step S306.

In the step S306, the imaging object brightness Bv[APEX] is obtained based upon the shooting conditions of the Exif tag data 92 stored in the image file 90, and B[cd/m²] is obtained from the Bv[APEX].

Specifically, Av, Tv, and Sv values are obtained with the formulas mentioned below, each of which are APEX (Additive Photographic EXposure) value of lens aperture (F), exposure time (T[sec]), and film ISO sensitivity.

$$Av=2\log_2(F),$$

$$Tv=-\log_2(T),$$

$$Sv=\log_2(ASA/3.125)$$

Figure 8A:
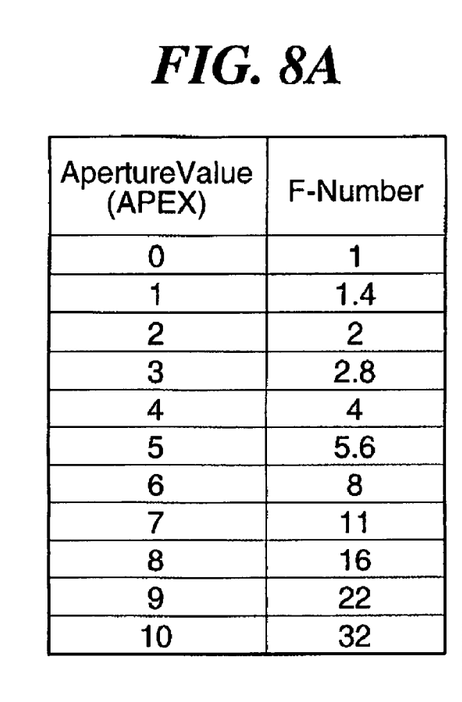
FIGS. 8A to 8C are views showing APEX conversion tables.
Figure 8B:
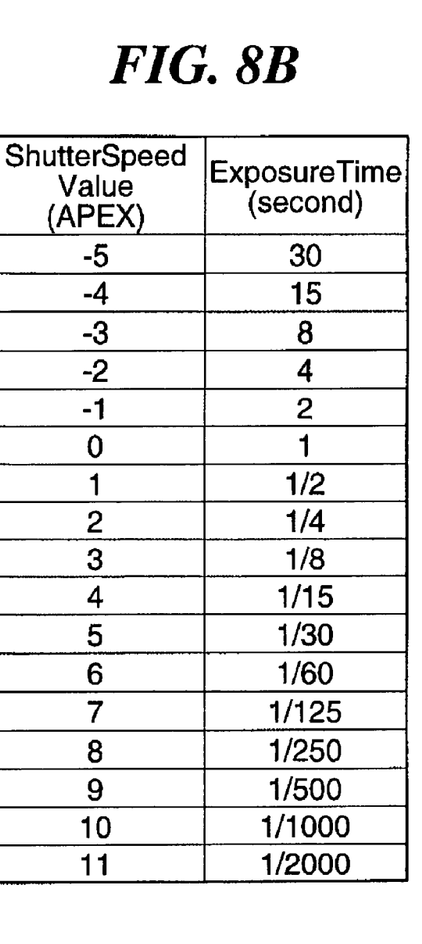
Figure 8C:
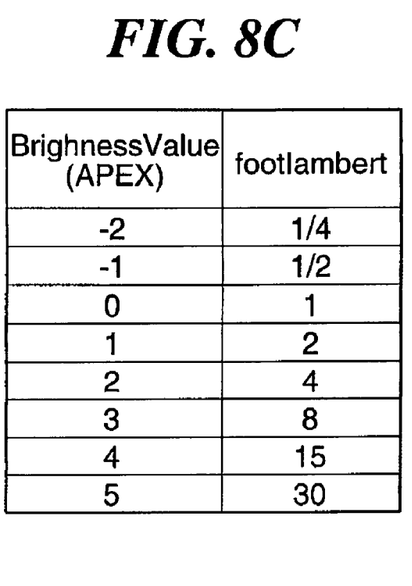

Between the exposure index value (Ev[APEX]) by the exposure meter equivalent to the brightness to 18% gray, and the four values of film ISO sensitivity (Sv[APEX]), the shutter speed (Tv[APEX]), the lens aperture (Av[APEX]) and the imaging object brightness (By[APEX]), the following relational expressions are true under the optimum exposure condition (Ev=10), as is shown in an APEX conversion table in FIGS. 8A to 8C;

$$Ev=Av+Tv=Bv+Sv$$

For example, if the exposure time is 1/125[sec], and the lens aperture is F2.8, then Tv=7[APEX] and Av=3[APEX] are obtained, and Ev=7+3=10 is true. If Ev=10 is true, even the combination of Tv=6[APEX]=1/60[sec] and Av=4[APEX]=F4 makes it possible to shoot with proper exposure.

Based on the aforementioned relational expressions, the brightness (By[APEX]) of a shooting object can be obtained as follows;

$$Bv = Av + Tv - Sv$$
$$= 2\log_2(F) - \log_2(T) - \log_2(ASA/3.125))$$

Furthermore, the following relational expressions are true between the brightness of an imaging object (Bv[APEX]) and the brightness B[cd/m²];

$$Bv=\log_2(B/NK)$$

$$B=NK\cdot(2Bv)$$

For example, if lens aperture (F) is 2.8, the exposure time (T[sec]) is 1/160, and the film ISO sensitivity (ASA) is 200, then Bv[APEX] is calculated as follows;

$$Bv = Av + Tv - Sv$$
$$= 2\log_2(F) - \log_2(T) - \log_2(ASA/3.125))$$
$$= 2\log_2(2.8) - \log_2(1/160) - \log_2(200/3.125))$$
$$= 4.32$$

Based upon this calculated Bv[APEX], the brightness B[cd/m²] is calculated as follows;

$$Bv=\log_2(B/NK), NK=3.426$$

$$B=3.426\cdot(2Bv)=65.11 \ [\text{cd/m}^2]$$

In a step S307, the adaptation luminance and the relative luminance of background are calculated. The adaptation luminance (LA[cd/m²]) is equivalent to the luminance B calculated in the step S306. The relative luminance of background (Yb[%]) is set at 18% in a step S307. In the case of proper exposure, the luminance B is assumed to represent the luminance of reflected light obtained when the shooting object is 18% gray.

In a step S308, it is determined from the exposure control mode data of the Exif tag data whether or not the exposure control mode is manual exposure.

In the case of manual exposure, because it can be considered that a photographer has set the optimum exposure conditions (lens aperture Av, shutter speed Tv) with an Ev value an exposure meter indicates, it can be assumed that Bv indicates the brightness to an imaging object of reflectance 18%.

On the contrary, in the case of automatic exposure (AE), because the exposure conditions are automatically set with a photometric sensor in a digital camera, it can be assumed that Bv indicates the brightness to an actual imaging object. It often happens that an actual imaging object is whiter and higher in reflectance than gray 18%.

Therefore, in the case of automatic exposure, the relative luminance of background (Yb[5]) set in the step S307 is required to be corrected.

In the case of automatic exposure (AE), because the photometry of an imaging object is performed, the EV value obtained from the lens aperture (Av) and the shutter speed (Tv) is not always equivalent to the Ev value by an exposure meter. This is because the reflectance of the imaging object is not always 18%, and when the shooting object is whitish (high reflectance), an automatically set exposure is inclined to be rather low.

In a step S308, if it is determined that the exposure control mode is manual exposure, the process proceeds to a step S312 because it is not required to correct the relative luminance of background set in the step S307.

Meanwhile, in the step S308, if it is determined that the exposure control mode is automatic exposure, in a step S309 it is determined whether or not there is a shot image of a gray chart (18% gray) shot under the same viewing conditions as those of a shot image to be processed in a step S309. If there is not a shot image of the gray chart, the relative luminance value of background is corrected to 20%, and the process proceeds to a step S312. As was mentioned above, it often happens that an actual imaging object is whiter and higher in reflectance than gray 18%. Therefore, according to the embodiment of the present invention, 20% is applied as an experience value.

On the other hand, if there is a shot image of a gray chart, the process proceeds to a step S310, and the corrected value of the relative luminance of background is calculated with the shooting condition parameter value (hereinafter referred to as "The another shooting condition parameter value") of the Exif tag information to a shot image of the gray chart.

The another shooting condition parameter value mentioned above is not limited to the shooting condition parameter value of the Exif tag information of a shot image to the gray chart if the relative luminance value of background can be corrected in the case of manual exposure.

In a step S310, the luminance B' [cd/m$^2$] is calculated based on the shooting condition data of the gray chart (for example, lens aperture and shutter speed).

In a step S311, the relative luminance value of background YB[%] is corrected to 18·B/B'[%].

In a step S312, the surrounding luminance level is decided. The surrounding luminance level according to the embodiment of the present invention is set in response to the relative luminance value of background. That is, the surrounding luminance level is set at "Average" when the relative luminance value of background is higher than 20%, at "Dim" when it is lower than 20%, or at "Dark" when it is almost 0%. However, it is set at "Average" regardless of the relative luminance value of background in the case of manual exposure.

In a step S313, the white point relative XYZ value ($X_W Y_W Z_W$) is calculated. When the white point chromaticity parameter value (x, y) is set for Exif tag information, the relative XYZ value ($X_W Y_W Z_W$) is calculated with the following relational expressions;

$$X_W = (x/y) \cdot 100.0,$$

$$Y_W = 100.0,$$

$$Z_W = ((1-x-y)/y) \cdot 100.0$$

Meanwhile, when the type of light source is set for Exif tag information, a representative white point in response to the set light source is read out from a list of representative white points of respective light sources held in an information processor in advance, and the relative XYZ value ($X_W Y_W Z_W$) is calculated with the following relational expressions;

$$X_W = (x_r/y_r) \cdot 100.0,$$

$$Y_W = 100.0,$$

$$Z_W = ((1-x_r-y_r)/Y_r) \cdot 100.0$$

By the above process, the viewing condition parameters can be set from the Exif tag information of a shooting image file.

Therefore, the viewing conditions proper for an image shot by a digital camera can be set easily without any aid from a user.

Next, a profile making process of FIG. 5, which will be described below, is carried out in a step S305 to thereby select a profile dependent on a light source, before performing color matching (step S314), followed by terminating the process.

Figure 5:
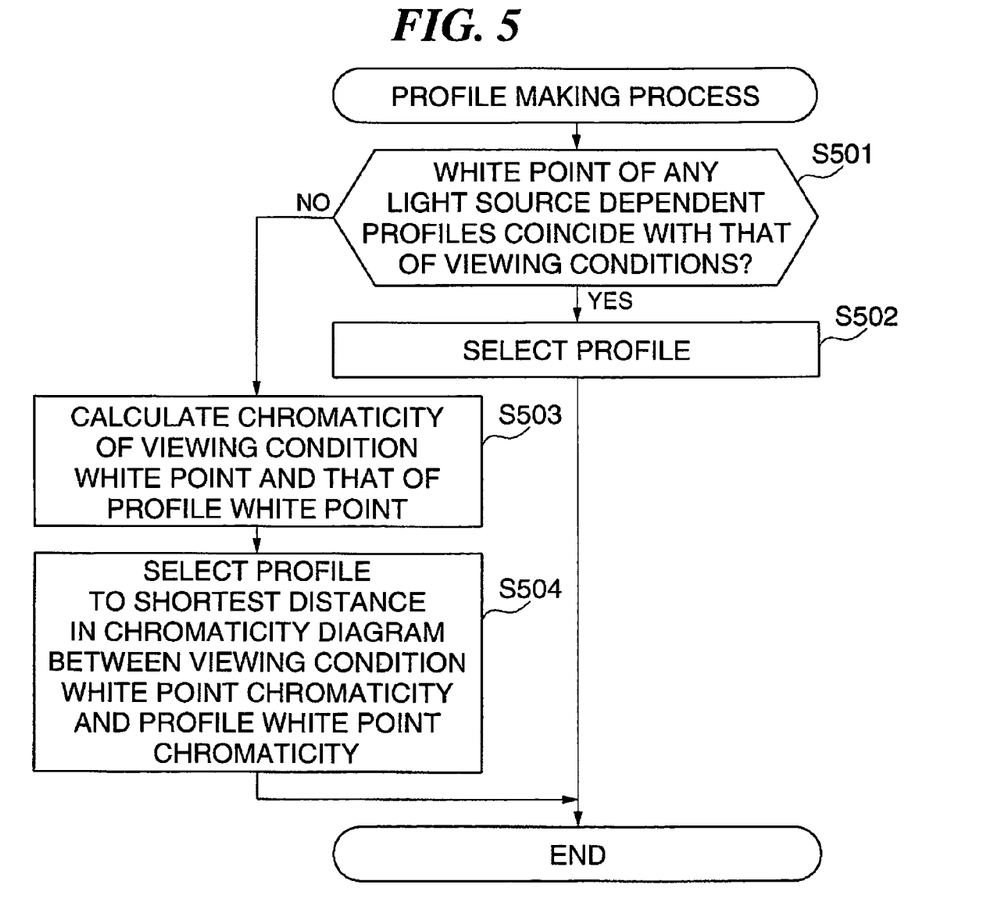
FIG. 5 is a flowchart showing the procedure of a profile making process that is performed in a step S305 in FIG. 3.

FIG. 5 is a flowchart showing the procedure of a profile making process that is performed in a step S305 in FIG. 3. In this procedure, the input side profile 21 is set based on the input side viewing conditions set by the input side viewing condition setter 93. Furthermore, preliminarily one profile is selected from a bunch of profiles in response to a plurality of light sources pre-held based on the input side viewing condition white point relative XYZ value obtained in the step S313 in FIG. 3.

Then, if there is any white point relative XYZ value resulting in the profile is equivalent to the input side viewing condition white point relative XYZ value ($X_W Y_W Z_W$) (YES to a step S501), the profile is selected in a step S502, followed by terminating the process.

Meanwhile, as a result of the determination in the step S501, if it is not equivalent, a profile corresponding to a white point closest, in a chromaticity diagram, to the input side viewing condition white point relative XYZ value ($X_W Y_W Z_W$) is selected.

Viewing condition white point chromaticity ($x_1$, $y_1$) and white point chromaticity ($x_2$, $y_2$) of a profile white point relative XYZ value ($X_r$, $Y_r$, $Z_r$) are calculated with the following relational expressions based on the input side viewing condition white point relative XYZ value ($X_W Y_W Z_W$) in a step S503.

$$x_1 = X_w/(X_w + Y_w + Z_w), y_1 = Y_w/(X_w + Y_w + Z_w)$$

$$x_2 = X_r/(X_r + Y_r + Z_r), y_2 = Y_r/(X_r + Y_r + Z_r)$$

Next, a profile in response to the shortest distance (dist= $((x_1-x_2)^2+(y_1-y_2)^2)^{1/2}$) in a chromaticity diagram between the viewing condition white point chromaticity ($x_1$, $y_1$) and the profile white point chromaticity ($x_2$, $y_2$) is selected in a step S504.

Thereby, even if among profiles dependent on light sources any white point relative XYZ value is not equivalent to the viewing condition white point relative XYZ value, a profile dependent on a light source can be selected.

According to an embodiment of the present invention explained above, the following effects can be achieved.

Moreover, input side viewing conditions can be set automatically by calculating the viewing condition parameters from the shooting conditions stored as additional data of the image.

Furthermore, the viewing condition parameters can be set with great credibility by changing the viewing condition parameter setting value according to the contents of the exposure control program stored as additional data of the image.

Profiles dependent on the light source can be selected automatically by selecting a profile based on the additional data of the image.

Meanwhile, the shooting condition data may be obtained from not only Exif tag data but also other data in response to the image information. A user may set the shooting conditions with the user interface. It is easier for a user proficient in camera shooting to set the shooting conditions rather than to set the viewing conditions directly.

Furthermore, in color matching, so long as it is performed in response to viewing conditions, any other matching method may be all right.

It goes without saying that the object of the present invention may also be accomplished by supplying a system or an apparatus with a storage medium (or a recording medium) in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of the above-mentioned embodiment on a computer, and the form of the program may be an object code, a program executed by an interpreter, or script data supplied to an OS.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program is supplied by downloading from another computer, a database, or the like, not shown, connected to the Internet, a commercial network, a local area network, or the like.

This application claims the benefit of Japanese Application No. 2005-025611 filed Feb. 1, 2005, which is hereby incorporated by reference herein in its entirety.

What is claimed is:

1. A color processing method comprising:
   an obtaining step of obtaining shot image data and a shooting condition of the image data, the shooting condition containing white point data, exposure time data, ISO sensitivity data, and lens aperture data;
   a viewing condition setting step of setting a relative XYZ value related to a white point in an input side viewing condition based on the white point data obtained from the shooting condition, and setting a value related to adaptation luminance in the input side viewing condition based on the exposure time data, the ISO sensitivity data, and the lens aperture data contained in the shooting condition;
   a profile setting step of setting a profile based on the set relative XYZ value related to the white point; and
   a converting step of converting the shot image data, using the set profile, into XYZ data depending on the input side viewing condition, and converting the XYZ data, using the set relative XYZ value related to the white point in the input side viewing condition and the set value related to the adaptation luminance, into color appearance data independent from the input side viewing condition.

2. A color processing method as claimed in claim 1, wherein:
   the shooting condition includes a type of exposure control method,
   a relative luminance of background is set at 18% when the exposure control method is manual, and
   a relative luminance of background is set at any value different from 18% when the exposure control method is automatic.

3. A non-transitory machine readable medium encoded with a computer readable program executable by a computer for executing a color processing method comprising:
   an obtaining step of obtaining shot image data and a shooting condition of the image data, the shooting condition containing white point data, exposure time data, ISO sensitivity data, and lens aperture data;
   a viewing condition setting step of setting a relative XYZ value related to a white point in an input side viewing condition based on the white point data obtained from the shooting condition, and setting a value related to adaptation luminance in the input side viewing condition based on the exposure time data, the ISO sensitivity data, and the lens aperture data contained in the shooting condition;
   a profile setting step of setting a profile based on the set relative XYZ value related to the white point; and
   a converting step of converting the shot image data, using the set profile, into XYZ data depending on the input side viewing condition, and converting the XYZ data, using the set relative XYZ value related to the white point in the input side viewing condition and the set value related to the adaptation luminance, into color appearance data independent from the input side viewing condition.

4. An image pickup apparatus comprising:
   an obtaining unit configured to obtain shot image data and a shooting condition of the image data, the shooting condition containing white point data, exposure time data, ISO sensitivity data, and lens aperture data;
   a viewing condition setting device configured to set a relative XYZ value related to a white point in an input side viewing condition based on the white point data obtained from the shooting condition, and to set a value related to adaptation luminance in the input side viewing condition based on the exposure time data, the ISO sensitivity data, and the lens aperture data contained in the shooting condition;
   a profile setting device configured to set a profile based on the set relative XYZ value related to the white point; and
   a converting device configured to convert the shot image data, using the set profile, into XYZ data depending on the input side viewing condition, and converting the XYZ data, using the set relative XYZ value related to the white point in the input side viewing condition and the set value related to the adaptation luminance, into color appearance data independent from the input side viewing condition.

* * * * *